Figure 1:
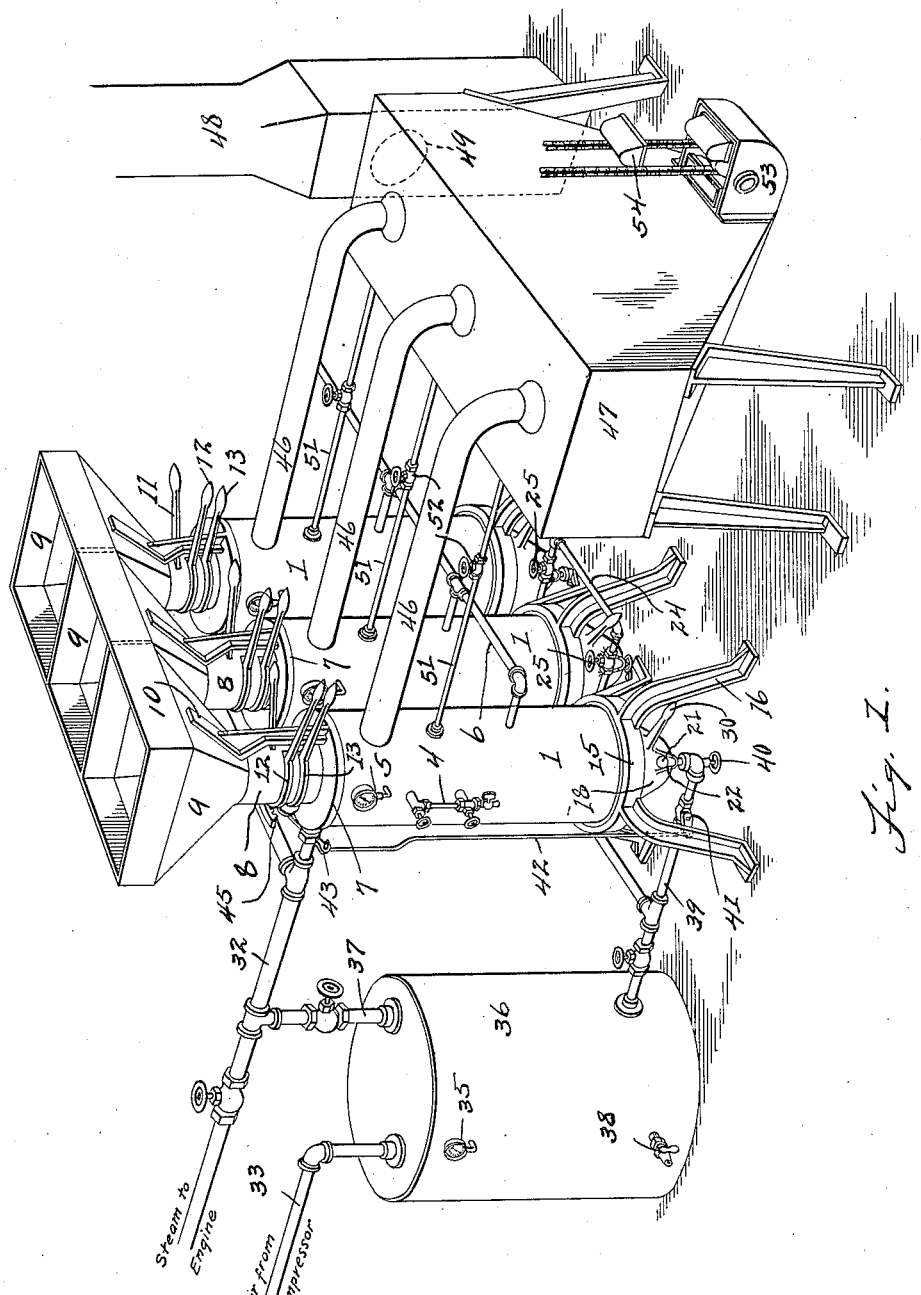

G. W. HASKIN.
REFUSE DISPOSAL AND REDUCTION PLANT.
APPLICATION FILED MAY 23, 1911.

1,091,837.

Patented Mar. 31, 1914.
4 SHEETS—SHEET 1.

Fig. I.

WITNESSES:
Walter Greenburg
Richard Alspas

INVENTOR.
George W. Haskin
BY Charles E. Winner
his ATTORNEY.

G. W. HASKIN.
REFUSE DISPOSAL AND REDUCTION PLANT.
APPLICATION FILED MAY 23, 1911.

1,091,837.

Patented Mar. 31, 1914.

4 SHEETS—SHEET 3.

WITNESSES:
Walter Greenburg
Richard Alspas

INVENTOR.
George W. Haskin
BY Charles E. Visner
his ATTORNEY.

G. W. HASKIN.
REFUSE DISPOSAL AND REDUCTION PLANT.
APPLICATION FILED MAY 23, 1911.
1,091,837.
Patented Mar. 31, 1914.
4 SHEETS—SHEET 4.
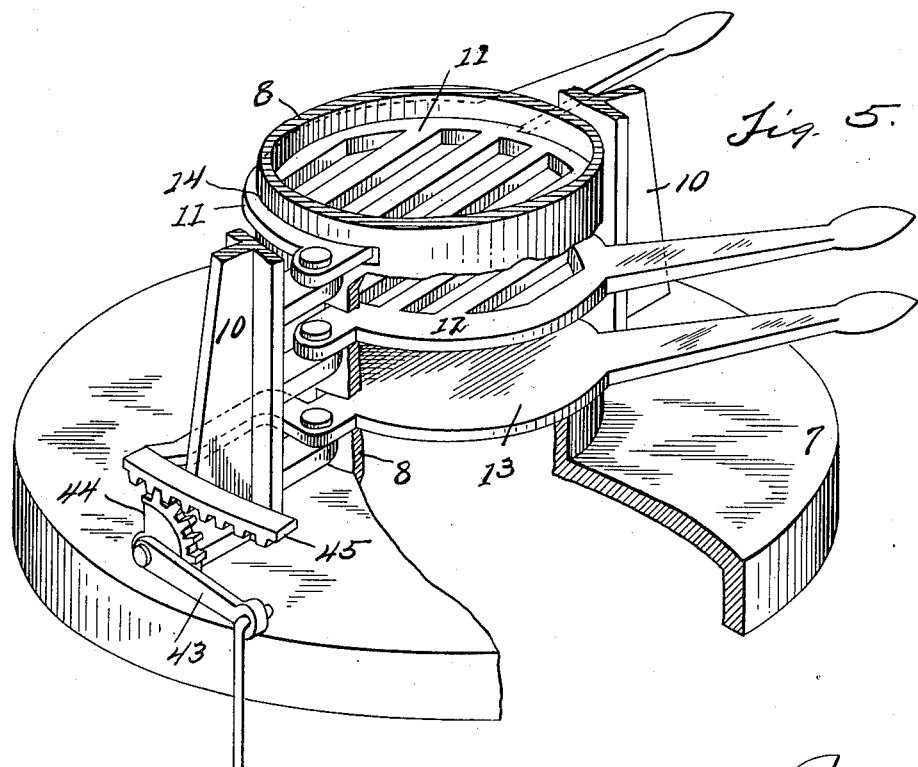
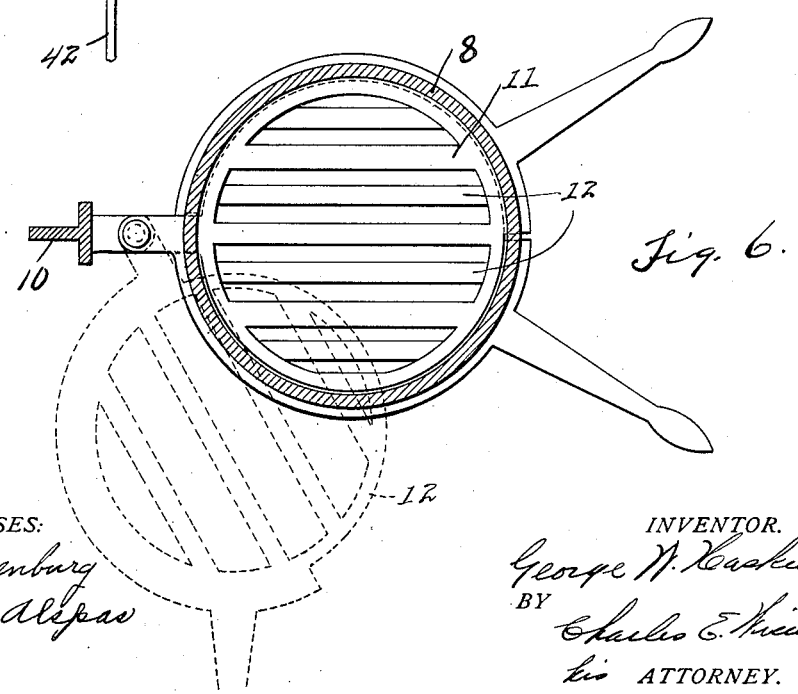
WITNESSES:
Walter Greenburg
Richard Alspas
INVENTOR.
George W. Haskin
BY
Charles E. Riemer
his ATTORNEY.

UNITED STATES PATENT OFFICE.

GEORGE W. HASKIN, OF DETROIT, MICHIGAN.

REFUSE DISPOSAL AND REDUCTION PLANT.

1,091,837. Specification of Letters Patent. Patented Mar. 31, 1914.

Application filed May 23, 1911. Serial No. 629,084.

*To all whom it may concern:*

Be it known that I, GEORGE W. HASKIN, a citizen of the United States, residing at Detroit, county of Wayne, State of Michigan, have invented a certain new and useful Improvement in Refuse Disposal and Reduction Plants, and declare the following to be a full, clear, and exact description of the same, such as will enable others skilled in the art to which it pertains to make and use the same, reference being had to the accompanying drawings, which form a part of this specification.

This invention relates to refuse disposal and reduction plants and its object is a plant in which the vast quantities of waste material of all descriptions usually found in the streets and alleys of cities may be utilized and disposed of in an economical and efficient manner and made commercially valuable.

To this end the plant consists essentially of an incinerator in which the heat evolved in the burning of the refuse is utilized in the production of steam, an engine and air compressor utilizing a portion of the steam thus evolved for the production of compressed air, a compressed air storage tank connected with the incinerator furnishing a blast therefor by means of which combustion is accelerated, a storage compartment for ashes connected with the incinerator by the smoke flue and into which ashes may be carried by the compressed air blast, and a smoke stack connected with the ash storage compartment by means of which the gases produced by combustion may be carried off. A portion of the steam is also used to precipitate the ashes in the storage compartment to prevent the lighter particles thereof from passing out into the smoke stack.

By burning the refuse in a plant of this nature, the waste material is not only greatly reduced in bulk but steam is produced in sufficient quantities for commercial use and the incinerator is so arranged that such material as molten metal may be separated from the mass forming a valuable by-product of the process.

These and various other novel features in the construction and arrangement of the several parts are hereinafter more fully described and claimed.

Figure 2:
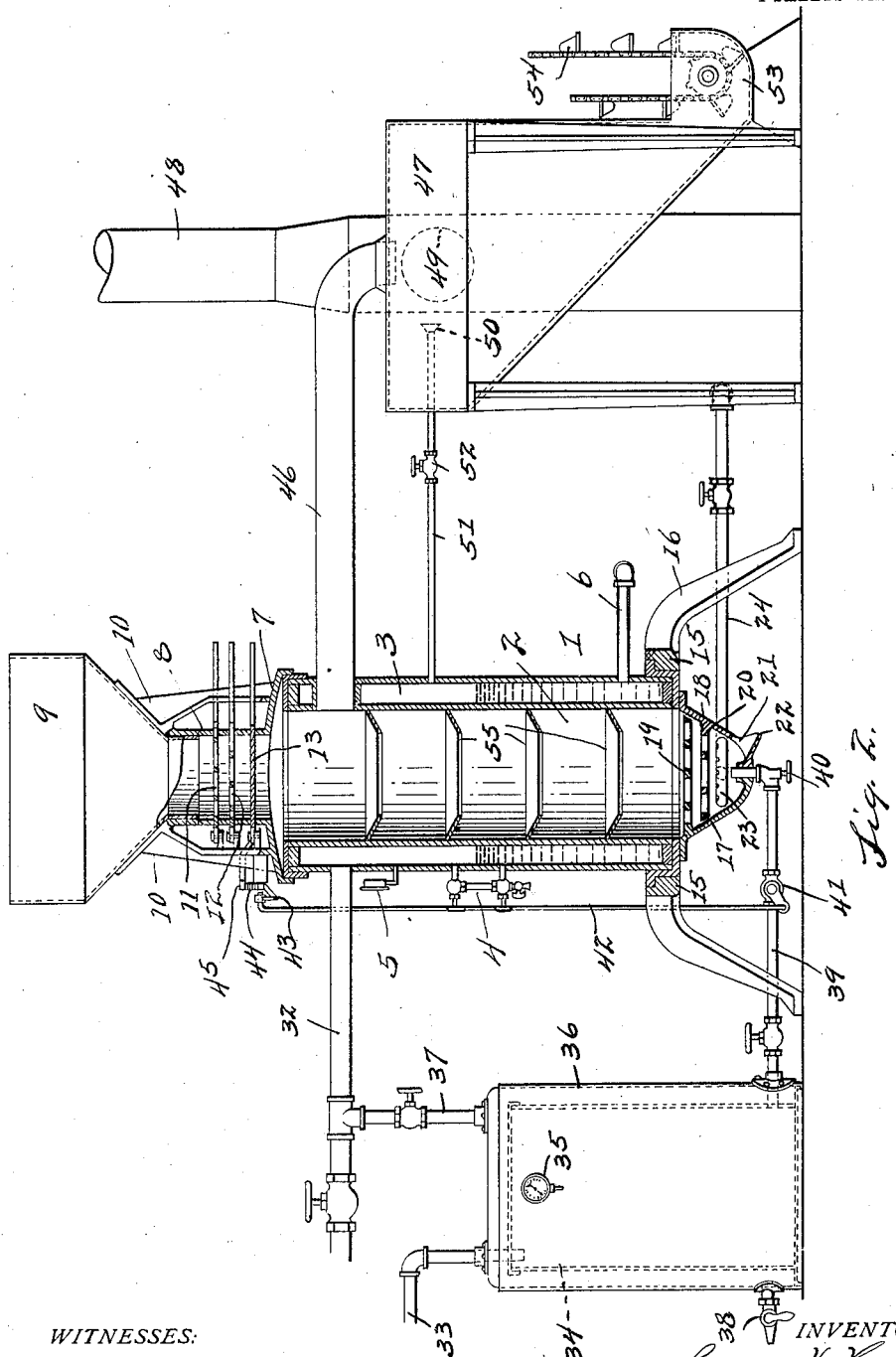
Figure 3:
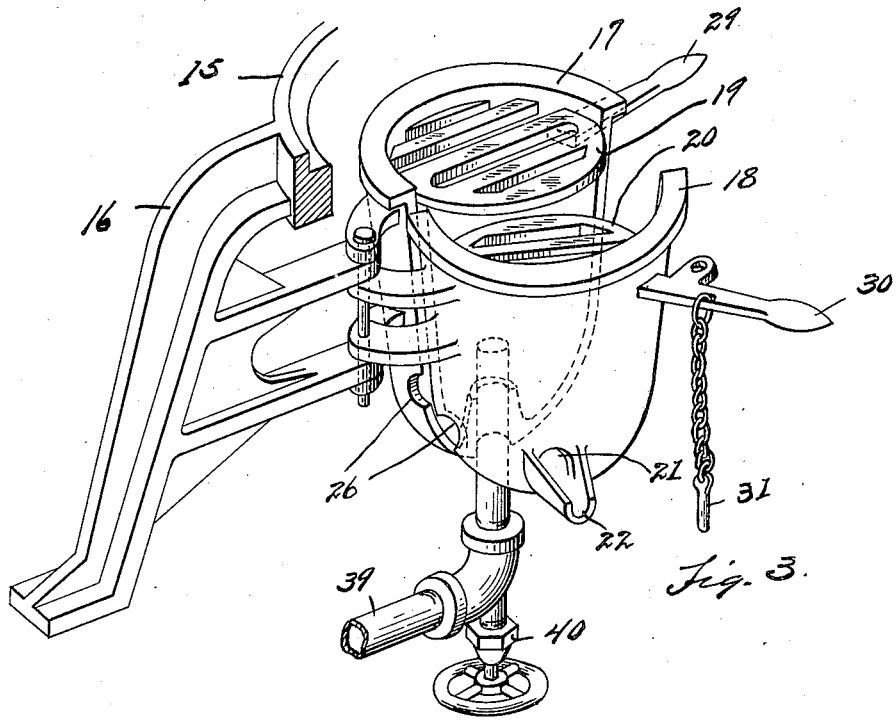
Figure 4:
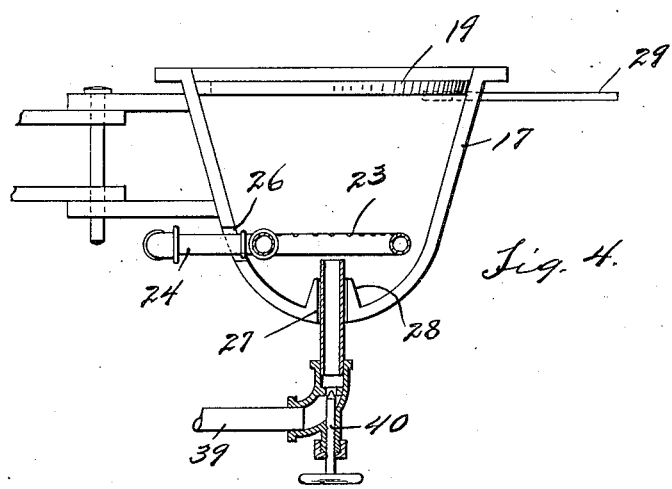

In the drawings Figure 1 is a perspective view of a plant embodying my invention. Several incinerators are shown connected together to form a plant of large capacity. Fig. 2 is a side elevation of a plant showing the incinerator in detail. Fig. 3 is a perspective view of the bottom part of the incinerator showing the grates. Fig. 4 is an elevation of a portion of the bottom part of the incinerator showing the air valve and burner. Fig. 5 is a detail of the cover for the incinerator showing the sorting grates etc. Fig. 6 is a plan view of the sorting grates.

Similar characters refer to similar parts throughout the drawings and specification.

The incinerator 1 has a vertical combustion chamber 2 and although not so shown may be lined with fire brick. Surrounding the combustion chamber is a water chamber 3 provided with a water gage 4 and a pressure gage 5. Water may be supplied to the chamber by any suitable means as the inlet piping 6 connected to an ordinary boiler feed pump (not shown). The water chamber is closed at the top and bottom as shown in Fig. 2 and should be provided with a safety valve. A cover 7 is provided for the combustion chamber which has a tubular part or passage 8 through which material from the hopper 9 passes into the combustion chamber. The hopper may be supported in any suitable manner as by the supporting arms 10 with which the cover is provided. The passageway 8 is provided with a pair of hinged grates 11 and 12 below which is a hinged plate 13 for opening or closing the passageway. Both the grates and the plate may be hinged to one of the supporting arms 10 as shown in Fig. 5.

As heretofore mentioned, the material supplied to the hopper consists of waste matter of all descriptions both fine and coarse and the utility of the grates is in sorting the material and allowing the finer parts thereof to pass into the combustion chamber prior to the coarser and more refractory parts, and to allow such coarse material to pass into the chamber, the grates may be wholly withdrawn from the passageway as indicated in dotted lines in Fig. 6, the walls of the passage being slotted for such purpose as shown at 14 in Fig. 5. The grates 11 and 12 and the valve plate 13 are provided with handles by means of which they may be operated.

The body of the incinerator may be supported by the frame 15 provided with legs 16, and hinged to one of the legs is a bowl shaped casting forming of two parts 17 and 18 each provided with a grate, the grate 20 of the part 18 being so arranged that it is directly beneath the grate 19 of the part 17 when the two parts are closed in which position they form a closure for the combustion chamber. The grates 19 and 20 as well as the grates 11 and 12 are so arranged that the bars of the lower grate in each instance are directly beneath the openings between the bars of the upper grate. By opening the grates to such extent that the bars of the lower are practically beneath the bars of the upper grate, material that can pass through the space between the bars may pass through both grates. By this arrangement the material in the hopper may be sorted as it passes into the combustion chamber and the more refractory parts thereof, such as tin cans etc., placed in position to be subjected to the greatest heat. As such parts become melted, the molten material passes down through the chamber into the bowl shaped casting at the bottom and out through the opening 21 in the part 18 which is provided with a spout 22 for such purpose. The grates at the bottom of the chamber having the same arrangement as those at the top, such material as clinkers, etc., may be removed without removing the contents of the chamber and if it is desired to remove the contents of the chamber, the grates may be swung out from under the chamber thus opening it to the fullest extent.

Located beneath the grate 20 is an oil burner 23 connected with a source of supply by means of the pipe 24 provided with a valve 25 for regulating the flow of oil therethrough. The pipe passes into the bowl shaped casting through the opening 26, one half of which being formed in each part 17 and 18 which allows the casting or fire-box to be opened without disturbing said piping. At the bottom of the fire-box is an opening 27 for the introduction of the air pipe (hereinafter described). Surrounding this opening is a wall 28 extending upwardly for a short distance the utility of which is in preventing the molten metal from flowing out through the opening. A half part of the opening and wall is formed in each part of the fire-box for the same reasons as the opening 26. Each part 17 and 18 of the fire-box is provided with a handle 29 and 30 respectively and a pin 31 is provided to lock the parts in closed position.

By the heat evolved by the combustion of material in the chamber 2, steam is produced in the chamber 3 which, by means of the pipe 32, may be utilized in running a steam engine operating an air compressor. The engine and compressor are not shown in the drawings, their functions being so well known that any one familiar with such apparatus may connect them in operative relation with the piping shown. Leading from the air compressor is a pipe 33 connected with the storage tank 34 which is provided with a pressure gage 35. The tank 34 may be placed within a larger tank 36 and steam introduced into said tank to heat the air in the smaller tank by means of the pipe 37 connecting with pipe 32. The larger tank is to be provided with an air cock 38. Leading into the fire box at the bottom of the incinerator is a pipe 39 connected with the air tank 34 by means of which an air blast is furnished for the incinerator. A needle valve 40, as shown in Fig. 4, provides a means for regulating the intensity of the blast. The pipe 39 is also provided with a shut-off valve 41 operatable by means of the rod 42 connected with the rock lever 43 mounted on the cover 7 as shown in Fig. 5. Formed integrally with the lever is a segment 44 meshing with a rack 45 carried by the valve plate 13. The utility of thus operating the valve 41 is preventing the ashes from being blown out of the incinerator through the passage 8 as the parts are so connected that when the passage is opened by withdrawing the plate 13, the valve 41 is closed and vice versa. The combustion chamber 2 is provided with a smoke flue 46 near the top which leads into the top of the ash storage compartment 47 and the smoke stack 48 connects with the storage compartment through or by means of the opening 49 therein. Located near the top of the compartment 47 and in proper relation with the open end of the smoke flue 46 is a spraying device 50 connected with the chamber 3 by piping 51. As the smoke and ashes pass through the spray of steam in entering the compartment, the ashes are precipitated and thus prevented from being drawn out into the smoke stack. The pipe 51 has a valve 52 for regulating the spray. The storage compartment 47 has inclined sides and ends uniting at the bottom which is provided with an elevator boot 53. Ashes deposited in the compartment are guided into the boot and by means of the buckets 54 may be elevated and dumped into wagons or otherwise disposed of.

During the burning of the material in the chamber 2, the hopper should be filled with a charge in order that any wet material may be thoroughly dried before entering the chamber. The valve plate 13 prevents fire from coming in contact with material so stored. As the material in the chamber 2 becomes consumed, the mass gradually settles and the baffle plates 55, shown in Fig. 2, tend to force the material from the wall of the chamber toward the center thus insuring the proper burning of the entire mass.

As shown in Fig. 1, several incinerators may be connected together by piping to form a plant of large capacity and such arrange- Having thus briefly described my invention and its mode of operation, what I claim and desire to secure by Letters Patent of the United States is—

1. A plant of the character described comprising in combination, a plurality of individually controlled incinerators provided with water jacketed combustion chambers, said jackets being connected, an ash receptacle connected with the upper end of each combustion chamber by a passageway, an air blast for accelerating combustion in each chamber and removing ashes therefrom into the ash receptacle, and a spraying device in the receptacle at each point of introduction of ashes thereinto, said spraying device being connected with said water jackets.

2. A plant of the character described comprising in combination, a plurality of individually controlled incinerators each provided with a water jacketed combustion chamber, each of said jackets being connected to a single pipe line forming a steam supply, a refuse receiving hopper for each incinerator connected thereto by a passageway, a valve in each of said passageways, an ash receptacle, a passageway between the upper end of each combustion chamber and the receptacle, an air blast for accelerating combustion in each chamber and removing ashes therefrom through said passageways, a spraying device in the receptacle at each point of introduction of ashes thereinto, each spraying device being connected to a single water jacket, a valve in the passageway between each hopper and incinerator and means connected with said valve for controlling the air blast in the combustion chamber.

3. In combination, a steam producing incinerator, a refuse receiving hopper connected with the combustion chamber of the incinerator by a passageway, means in the passageway for sorting material as it passes therethrough, a valve in the passageway, a fire box at the bottom of the combustion chamber, an air blast for accelerating combustion in the fire box, a valve for regulating the intensity of the blast, a shut-off valve controlling said blast operable by the valve in the passageway leading from the hopper, a storage compartment for ashes, a pipe connecting the storage compartment to the upper end of the combustion chamber, said blast providing means for removing ashes from the chamber, means for precipitating ashes in the compartment, and means for removing gases from the compartment.

4. In combination, a steam producing incinerator, a refuse receiving hopper connected with the incinerator by a passageway, manually operatable means in the passageway for sorting the material as it passes into the incinerator, a valve for opening and closing said passageway, an air blast leading into the lower part of the combustion chamber, said blast being controlled by the valve in the passageway, a valve for regulating the intensity of the blast, a compartment into which the ashes are removed by said blast, and a spraying device connected with the incinerator for precipitating ashes in the compartment.

5. An incinerator comprising a vertical water-jacketed combustion chamber, a receiving hopper supported above the chamber, manually operatable means for sorting the material prior to entering the chamber, and a fire box forming a closure for the chamber at the bottom, said box being formed of two parts hinged together, each part having a grate connected therewith, the two grates being arranged in off-set relation, whereby unconsumed material may be removed from the combustion chamber a portion at a time.

6. An incinerator comprising a vertical, water-jacketed, combustion chamber, a receiving hopper supported above the chamber, a passageway between the hopper and the chamber, means in the passageway for sorting the material as it passes therethrough, a valve plate for opening or closing the passageway, a fire box forming a closure for the chamber at the bottom, an air blast for accelerating combustion in the chamber and freeing it of ashes, a valve for regulating the air blast, and a shut-off valve controlled by the valve plate in the passageway.

In testimony whereof, I sign this specification in the presence of two witnesses.

GEORGE W. HASKIN.

Witnesses:
CLIFFORD CLARK,
RICHARD ALSPAS.

Copies of this patent may be obtained for five cents each, by addressing the "Commissioner of Patents, Washington, D. C."